United States Patent
Hu et al.

(10) Patent No.: US 11,568,317 B2
(45) Date of Patent: Jan. 31, 2023

(54) ENHANCED GRADIENT BOOSTING TREE FOR RISK AND FRAUD MODELING

(71) Applicant: PAYPAL, INC., San Jose, CA (US)

(72) Inventors: Zhanghao Hu, San Jose, CA (US); Fangbo Tu, Sunnyvale, CA (US); Xuyao Hao, San Jose, CA (US); Yanzan Zhou, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 330 days.

(21) Appl. No.: 16/880,404

(22) Filed: May 21, 2020

(65) Prior Publication Data

US 2021/0365832 A1    Nov. 25, 2021

(51) Int. Cl.
  *G06N 20/00* (2019.01)
  *G06N 5/02* (2006.01)
  *G06N 20/20* (2019.01)

(52) U.S. Cl.
  CPC ............. *G06N 20/00* (2019.01); *G06N 5/02* (2013.01); *G06N 20/20* (2019.01)

(58) Field of Classification Search
  CPC ............ G06N 20/00; G06N 5/02; G06N 20/20
  See application file for complete search history.

(56) References Cited

U.S. PATENT DOCUMENTS

| | | | | |
|---|---|---|---|---|
| 6,317,735 | B1 * | 11/2001 | Morimoto | G06K 9/6282 707/694 |
| 10,360,220 | B1 * | 7/2019 | Gupta | G06N 5/045 |
| 10,762,200 | B1 * | 9/2020 | Salem | G06F 21/564 |
| 10,925,192 | B1 * | 2/2021 | Campiano | H05K 7/20836 |
| 11,100,158 | B1 * | 8/2021 | Han | G06F 16/535 |
| 11,144,117 | B1 * | 10/2021 | Choudhuri | G02B 27/01 |
| 2012/0323876 | A1 * | 12/2012 | Lymberopoulos | G06F 16/9535 707/706 |

(Continued)

FOREIGN PATENT DOCUMENTS

| | | | | |
|---|---|---|---|---|
| CN | 107870810 | * | 4/2018 | |
| EP | 3540654 A1 | * | 9/2019 | G06F 12/0223 |

(Continued)

OTHER PUBLICATIONS

Culfaz, "Gradient Boosting Using Random Forests for Application on the New York Taxi Fare Prediction Challenge", Oct. 22, 2018, 13 pages; https://urldefense.com/v3/_https:/towardsdatascience.com/gradient-boosting-using-random-forests-for-application-on-the-new-york-taxi-fare-prediction-f6101c592bf9.

*Primary Examiner* — Anne L Thomas-Homescu
(74) *Attorney, Agent, or Firm* — Haynes and Boone, LLP

(57) ABSTRACT

Methods and systems are presented for generating a machine learning model using enhanced gradient boosting techniques. The machine learning model is configured to receive inputs corresponding to a set of features and to produce an output based on the inputs. The machine learning model includes multiple layers, wherein each layer includes multiple models. To generate the machine learning model, multiple models are built and trained in parallel for each layer of the machine learning model. The multiple models use different subsets of features to produce corresponding output values. After a layer in built and trained, a collective error may be determined for the layer based on the output values from the different models in the layer. An additional layer of models may be added to the machine learning model to reduce the collective error of a previous layer.

20 Claims, 6 Drawing Sheets

(56) References Cited

U.S. PATENT DOCUMENTS

| | | | |
|---|---|---|---|
| 2016/0155069 A1* | 6/2016 | Hoover | G06Q 30/06 706/12 |
| 2016/0162793 A1* | 6/2016 | Wang | G06F 16/24578 706/12 |
| 2018/0113967 A1* | 4/2018 | Agrawal | G01N 33/2022 |
| 2018/0349382 A1* | 12/2018 | Kumaran | G06F 17/12 |
| 2019/0164060 A1* | 5/2019 | Gulin | G06F 16/9027 |
| 2019/0164084 A1* | 5/2019 | Gulin | G06N 20/20 |
| 2019/0164085 A1* | 5/2019 | Gulin | G06N 20/00 |
| 2019/0171767 A1* | 6/2019 | Bolla | G06N 20/00 |
| 2019/0205885 A1* | 7/2019 | Lim | G06Q 20/4016 |
| 2019/0258904 A1* | 8/2019 | Ma | G06K 9/6269 |
| 2019/0377819 A1* | 12/2019 | Filliben | G06F 16/23 |
| 2019/0378010 A1* | 12/2019 | Morris | G06Q 20/4093 |
| 2019/0378050 A1* | 12/2019 | Edkin | G06N 20/20 |
| 2020/0027021 A1* | 1/2020 | Sastry | G06N 3/08 |
| 2020/0143284 A1* | 5/2020 | Tanaka | G06K 9/6256 |
| 2020/0192920 A1* | 6/2020 | Filonov | G06N 5/003 |
| 2020/0202252 A1* | 6/2020 | Asbag | G06F 16/285 |
| 2020/0241490 A1* | 7/2020 | Jermann | G07C 3/00 |
| 2020/0356900 A1* | 11/2020 | Briancon | G06N 5/022 |
| 2020/0366699 A1* | 11/2020 | Sampaio | H04L 63/0428 |
| 2020/0391755 A1* | 12/2020 | Lerner | G06N 5/003 |
| 2021/0117417 A1* | 4/2021 | Hendrickson | G06F 16/2465 |
| 2021/0181362 A1* | 6/2021 | Jiang | G06F 17/18 |
| 2021/0233148 A1* | 7/2021 | Govindan | G06Q 30/0643 |
| 2021/0241131 A1* | 8/2021 | Khawas | G06N 20/20 |
| 2021/0248149 A1* | 8/2021 | Somani | G06F 16/2255 |
| 2021/0266335 A1* | 8/2021 | Medalion | H04L 63/0227 |
| 2021/0287069 A1* | 9/2021 | Mumcuyan | G06F 16/90344 |
| 2021/0303783 A1* | 9/2021 | Misra | G06F 40/44 |
| 2021/0319359 A1* | 10/2021 | Ustimenko | G06N 5/003 |
| 2021/0357835 A1* | 11/2021 | Modi | G06F 40/194 |
| 2022/0019659 A1* | 1/2022 | Salem | G06F 21/566 |

FOREIGN PATENT DOCUMENTS

| | | | | |
|---|---|---|---|---|
| EP | 3901839 A1 | * | 10/2021 | G06F 16/2228 |
| WO | WO-2019106474 A1 | * | 6/2019 | G06F 16/53 |
| WO | WO2021012220 A1 | * | 7/2019 | |
| WO | WO-2020129031 A1 | * | 6/2020 | G06F 40/216 |
| WO | WO-2021198389 A1 | * | 10/2021 | G06F 16/29 |
| WO | WO-2021208535 A1 | * | 10/2021 | |

* cited by examiner

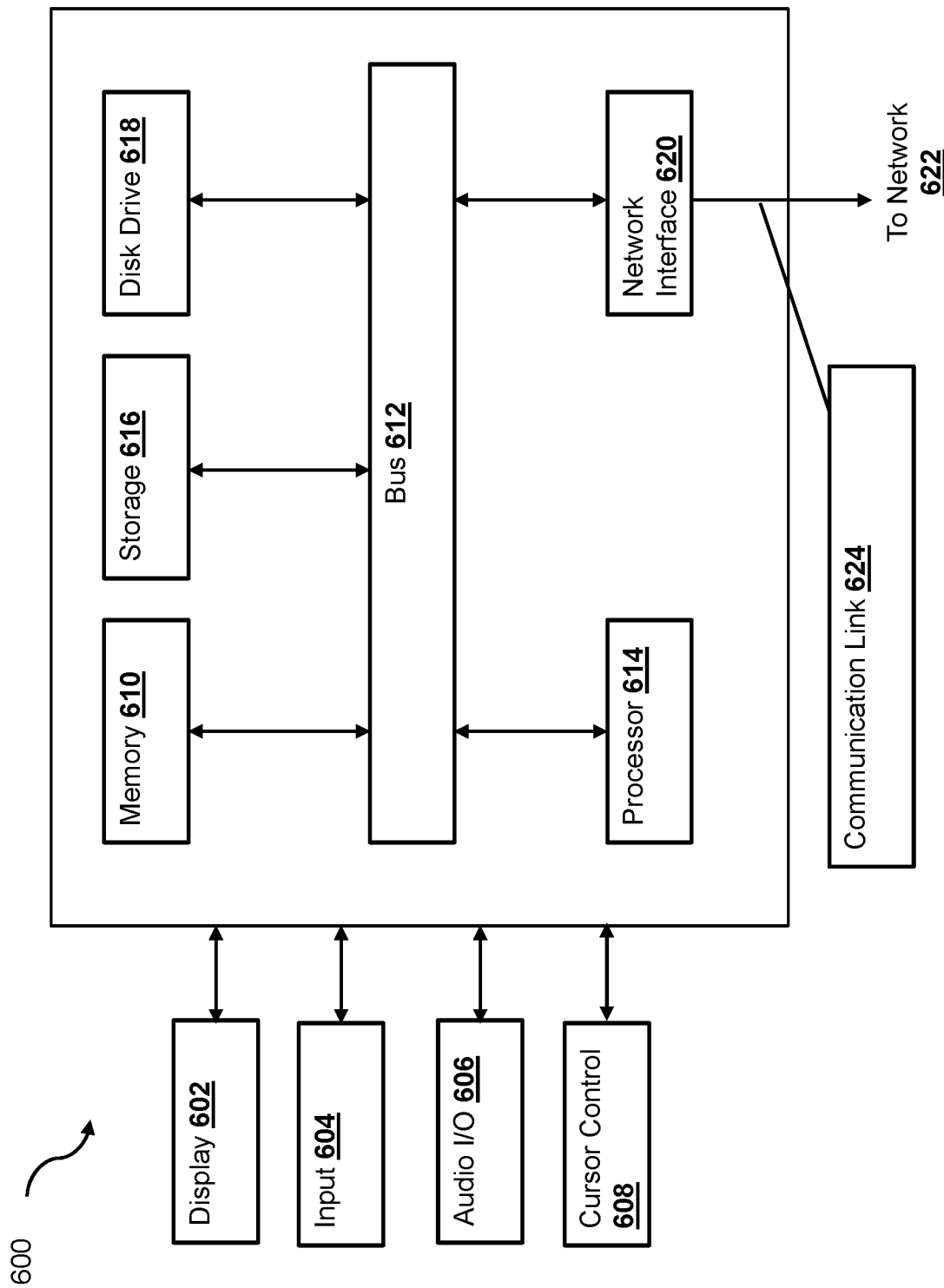

ENHANCED GRADIENT BOOSTING TREE FOR RISK AND FRAUD MODELING

BACKGROUND

The present specification generally relates to risk and fraud modeling, and more specifically, to configuring a machine learning model for risk and fraud modeling according to various embodiments of the disclosure.

RELATED ART

Machine learning models are useful tools for representing real-world behavior. Based on sample data (also referred to as training data), a machine learning model can be trained to derive patterns that might not be perceivable by humans. The trained machine learning model can subsequently make predictions and/or classifications using the derived patterns. For example, an online service provider that receives transaction requests (e.g., login requests, payment requests, purchase requests, etc.) may use one or more machine learning models to predict a risk associated with a transaction request (or classify the transaction request as one of a risk classification such as low, medium, or high risk).

Different types of machine learning models may be better suited for different types of predictions and/or classifications. For example, gradient boosting tree is a type of machine learning model that is known for having high accuracy in making risk predictions and/or classifications. However, one drawback for the gradient boosting tree is the length of time it requires for building the model. Since the gradient boosting tree includes multiple decision trees, where each tree is configured and trained based on a previous tree, the trees are built sequentially (instead of in parallel). In an example where thousands of trees are built for the machine learning model, the time required to build the machine learning model can be lengthy. The length of time to build the machine learning model may be acceptable when the behavior pattern is considerably stable, and the machine learning model, once built and trained, can be used for a substantial amount of time without re-building. In certain areas of predictions and/or classifications such as online transaction risk prediction however, trends may come and go (and sometimes fairly frequently). To maintain an acceptable or required level accuracy in the predictions and/or classifications, the online service provider may be required to re-build the machine learning model frequently to adapt the changes in behavior patterns. Thus, there is a need for reducing the time required to build certain types of machine learning models without sacrificing their accuracy performance.

BRIEF DESCRIPTION OF THE FIGURES

FIG. 6 is a block diagram of a system for implementing a device according to an embodiment of the present disclosure.

Figure 1:
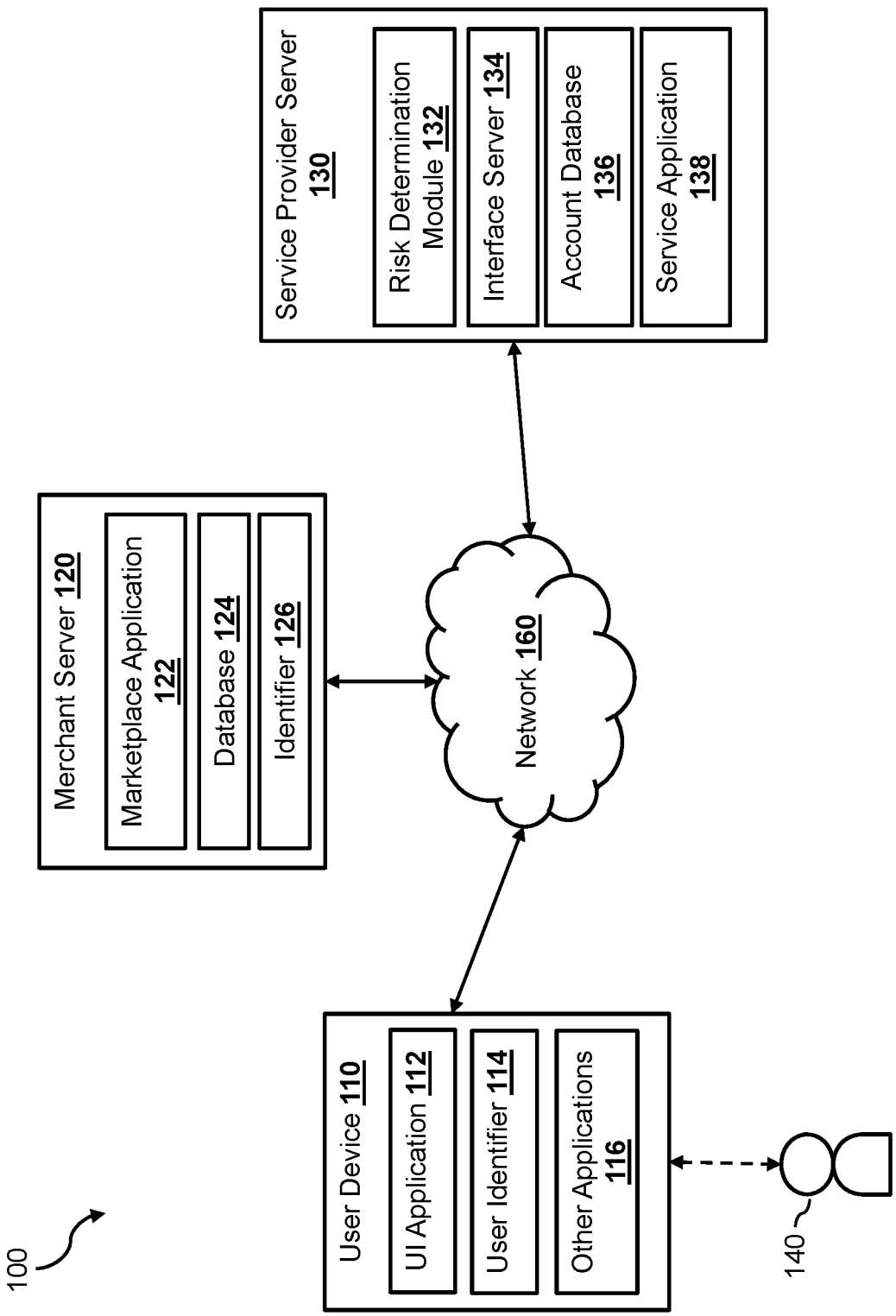
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for building and training a machine learning model for risk detection using enhanced gradient boosting techniques. Gradient boosting is a machine learning technique for generating a machine learning model by compiling multiple different models. A machine learning model implemented using such a gradient boosting technique may be called a gradient boosting tree. The gradient boosting tree may be configured to receive input values corresponding to a set of features and to provide one or more output values that correspond to a prediction and/or a classification based on the input values. Each of the different models may be implemented in the form of a decision tree, and may be configured to receive input values corresponding to a subset of the set of features to produce a corresponding prediction and/or a classification. Since each of the different models is configured to make the prediction and/or classification based on only a subset of the set of features (and typically a small subset, such as two, three, or five different features), the accuracy performance of each of the different models may be relatively low. However, by compiling and combining the different models together to form the gradient boosting tree, the accuracy performance of the gradient boosting tree may be substantially improved.

In some embodiments, the different models are compiled by sequentially adding one individual model (e.g., a tree) at a time to the gradient boosting tree. For example, the gradient boosting tree may begin with a first layer having a first model (e.g., a first decision tree). The first model may be configured to receive input values corresponding to a first subset of the set of features (e.g., two, three, five, etc.) as input values and is trained (e.g., using training data) to produce one or more output values corresponding to a prediction and/or classification (e.g., a risk associated with a transaction request, etc.). Based on an error associated with the one or more output values (e.g., how the output values deviate from the actual risk of a transaction request), a second model may be added on top of the first model (to a second layer of the gradient boosting tree) to supplement the first model.

The second model may be configured to receive input values corresponding to a second subset of the set of features and is trained to produce one or more output values corresponding to the prediction and/or classification (e.g., a risk associated with a transaction request, etc.). In some embodiments, the second model is trained to produce the one or more output values that reduces the error of the output values from the first model. The second subset of the features may be different from the first subset of the features. Additional models may be sequentially added to additional layers of the gradient boosting tree, where each model that is added to the gradient boosting tree is configured to receive input values corresponding to a different subset of the features and is trained to produce one or more output values that reduce the error of the previous layer (or the existing gradient boosting tree). Since each model has to be added to the existing gradient boosting tree and trained with training data before another model can be added to the gradient boosting tree, the time to build the gradient boosting tree is linear to the number of models added to the tree.

In a scenario where the gradient boosting tree is configured by an online service provider to predict a risk of a transaction request (e.g., a login transaction for logging into an account with the online service provider, a payment transaction using funds from the account, an information access transaction for accessing information associated with the account, a purchase transaction for making a purchase using funds from the account, etc.), the gradient boosting tree may be configured to accept input values corresponding a set of features related to the transaction request and to provide a risk prediction associated with the transaction request based on the set of features. The features may be related to attributes associated with the transaction request (e.g., an amount, a merchant identity, a product or a service associated with the transaction request, etc.), attributes associated with a device used to submit the transaction request (e.g., a device manufacturer, a browser type, a location of the device, an operating system, an Internet Protocol (IP) address, a device identifier, browsing history associated with the device, etc.), and attributes associated with the user account associated with the transaction request (e.g., a transaction history of the user account, a transaction failure rate, device types and IP addresses used for the user account, etc.). The set of features, in some cases, can include thousands, hundreds of thousands, and even millions of different features.

As such, the gradient boosting tree may include a large number of models (e.g., 1,000, 10,000, etc.), where each model is configured to make a prediction and/or classification based on a small subset (e.g., 2, 3, 5, etc.) of the set of features. The time required to generate the gradient boosting tree by sequentially building and training the large number of models can be quite substantial, which can be prohibitively long when the gradient boosting tree needs to be re-built (e.g., re-trained) frequently.

Thus, according to various embodiments of the disclosure, a risk determination system may be configured to build a machine learning model for risk detection using an enhanced gradient boosting technique that drastically reduces the amount of time required to generate the machine learning model while maintaining the accuracy performance of a gradient boosting tree. In some embodiments, using the enhanced gradient boosting technique, the risk determination system may build and train multiple models at the same time (e.g., in parallel). For example, the risk determination system may build and train a first set of models for a first layer of the enhanced gradient boosting tree. Each of the models may be implemented as a decision tree (similar to the ones used in the conventional gradient boosting tree) or any other type of machine learning models, such as a regression model, a neural network, etc. The first set of models may include multiple different models (e.g., 3, 5, 7, etc.). Each model in the first set of models may be configured to receive input values corresponding to a different subset of the set of features and to produce one or more output values corresponding to a prediction and/or classification (e.g., a risk of a transaction request, etc.). In some embodiments, the subsets of the set of features associated with the first set of models may be non-overlapping or partially overlapping. Importantly, the models in the first layer are not dependent on each other (e.g., each model is not configured to supplement another model in the first layer, and each model can be built and trained without having to wait for another model to complete the building and training process). Thus, in contrast to the conventional gradient boosting techniques (or other similar conventional ensemble models), the models in the first layer of the enhanced gradient boosting tree that is generated using the enhanced gradient boosting technique can be built and trained with training data independently from each other. As a result, the risk determination system may build and train the first set of models in parallel.

After building and training the first set of models of the first layer of the enhanced gradient boosting tree, the risk determination system may determine a collective error for the first layer of the enhanced gradient boosting tree based on the output values from the first set of models. The collective error for the first layer of the enhanced gradient boosting tree may be determined using different techniques. In some embodiments, the risk determination system may determine a collective output value representing a risk of the transaction request based on the output values obtained from each individual model from the first set of models. For example, the collective output value may be determined as an average of the output values from the first set of models. The risk determination system may then compute the collective error based on the collective output and the training data. In some embodiments, the risk determination system may determine the collective error by first calculating an error for each model in the set of models based on the output value(s) from the model and the training data. The risk determination system may then determine the collective error based on the errors of the first set of models (e.g., an average error).

The risk determination system may then build and train a second set of models for a second layer of the enhanced gradient boosting tree. The models in the second set of models may be configured to receive input values corresponding to different subsets (and in some embodiments, non-overlapping and/or partially overlapping subsets) of the set of features and to produce one or more output values corresponding to a prediction and/or classification (e.g., a risk associated with a transaction request, etc.). Similar to the first set of models, since the second set of models do not depend on each other, the second set of models can be built and trained independently from each other. Thus, the risk determination system may build and train the second set of models in parallel. In some embodiments, the second set of models are trained to produce the output values corresponding to the prediction and/or classification (e.g., a risk associated with a transaction request, etc.) with a goal to reduce the collective error associated with the previous layer (e.g., the first layer) of the enhanced gradient boosting tree. The manner in which the second set of models is trained to reduce the error of the previous layer can be performed similarly as a conventional gradient boosting tree, except that using the enhanced gradient boosting tree techniques, the collective error of the previous layer (rather than an error of the previous decision tree) is used as a reference point to be reduced based on the training.

After building and training the second set of models, the risk determination system may determine a collective error for the second layer of the enhanced gradient boosting tree based on the output values from the second set of models, using the same techniques to determine the collective error for the first layer. The risk determination system may then build and train a third set of models for a third layer of the enhanced gradient boosting tree in a similar manner as discussed herein with respect to the first and second layers of the enhanced gradient boosting tree. The third set of models may be configured to receive input values corresponding to different subsets of the set of features and to produce one or more output values corresponding to the prediction and/or classification. The third set of models may also be trained with a goal to reduce the collective error associated with the second layer of the enhanced gradient boosting tree.

In some embodiments, the risk determination system may continue to build and train models for additional layers of the enhanced gradient boosting tree. Each additional layer added to the enhanced gradient boosting tree is configured to supplement (e.g., improving the accuracy performance of) the exist enhanced gradient boosting tree by training the set of models in the additional layer to reduce the collective error associated with the previous layer of the enhanced gradient boosting tree. The risk determination system may continue to add additional layers to the enhanced gradient boosting tree until a termination condition is detected. The termination condition may be a threshold number of layers, a threshold number of models, a threshold error in the last layer, or a threshold error improvement between the last layer and the second-to-last layer. Thus, the risk determination system may stop adding additional layers to the enhanced gradient boosting tree when it detects the termination condition.

Since multiple models within the same layer of the enhanced gradient boosting tree can be built and trained in parallel, the enhanced gradient boosting tree can be generated using the enhanced gradient boosting technique in a substantially reduced amount of time than a comparable gradient boosting tree having the same number of models built using conventional gradient boosting techniques (e.g., faster by multiple factors based on the number of models included in each layer). By combining the same number of models (even some of which are combined in parallel instead of in sequence), the enhanced gradient boosting tree generated using the enhanced gradient boosting technique described herein has substantially similar accuracy performance as other gradient boosting trees generated using conventional gradient boosting techniques. In fact, it has been observed that models that are built using the enhanced gradient boosting technique has better performance stability when they are deployed in real-life than traditional gradient boosting tree, because having different models in each layer avoid any single model that overfits the prediction pattern to dominate a layer. Therefore, the enhanced gradient boosting techniques described herein enable enhanced gradient boosting trees to be generated in a much shorter amount of time while maintaining similar accuracy performances.

While the enhanced gradient boosting tree may have the same number of models in different layers in some embodiments, in other embodiments, the risk determination system may determine to have different numbers of models in different layers. For example, the risk determination system may increase (or decrease) the number of models as each additional layer is built and added to the enhanced gradient boosting tree. In some embodiments, the risk determination system may increase (or decrease) the number of models in each additional layer by a predetermined number. Thus, the risk determination system may build the set of models in the first layer of the enhanced gradient boosting tree to include a first number (e.g., 3, 5, etc.) of models. The risk determination system may then determine a second number of models for the second layer of the enhanced gradient boosting tree by adding the predetermined number of models to (or subtracting the predetermined number of models from) the first number. For each additional layer of the enhanced gradient boosting tree, the risk determination system may add (or subtract) the same number of models to or from the previous layer. In another example, the number of models in a subsequent layer may be dependent on the collective error associated with the previous layer. For example, when the collective error associated with the previous layer exceeds a threshold, the risk determination system may increase the number of models in the previous layer by a predetermined number. Conversely, when the collective error associated with the previous layer is below another threshold, the risk determination system may decrease the number of models in the previous layer by a predetermined number.

In some embodiments, the risk determination system may progressively increase (or decrease) the number of models as each additional layer is built and added to the enhanced gradient boosting tree. The risk determination system may determine the number of models in the second layer of the enhanced gradient boosting tree by adding (or subtracting) a first number (e.g., 1, 2, etc.) to/from the number of models in the first layer. The risk determination system may then progressively increase the number of models adding to (or subtracting from) the previous layer. Thus, the risk determination system may determine the number of models in the third layer of the enhanced gradient boosting tree by adding (or subtracting) a second number (e.g., 2, 4, etc.) that is larger than the first number to/from the number of models in the second layer. The number of models added to each layer from the previous layer is progressive larger (or progressively smaller) in some embodiments. In some embodiments, the risk determination system may increase (or decrease) the number of models only in a portion of the layers of the enhanced gradient boosting tree (e.g., the first few layers, every $10^{th}$ layer, etc.).

In some embodiments, the risk determination system may adjust and/or update a layer of models after training. As discussed herein, after training a layer of models, the risk determination system may determine a collective error for the layer of models based on the training data. In some embodiments, the risk determination system may also validate the layer of models by determining a collective error of the layer of models based on validation data that is different from the training data used to train the layer of models. Using a different set of data to validate the layer of models enable the risk determination system to determine how well the layer of models can be generalized to all kinds of data (instead of only the training data). When the difference between the training data-based collective error and the validation data-based collective error is larger than a threshold, the risk determination system may determine that an adjustment and/or update to the layer of models is needed, as the layer of model cannot be generalized. For example, the adjustment may include adding one or more new models to the layer of model. The number of new models added to the layer of model may be determined based on the difference between the training data-based collective error and the validation data-based collective error. The larger the difference, the more number of new models are added to the layer of models. The adjustment may also include using additional training data to train the layer of models.

As discussed herein, the risk determination system may select different subsets of the set of features for each model in each layer of the enhanced gradient boosting tree. The selection of different subsets of features may be performed using one or more algorithms (e.g., using a randomizer, etc.). In some embodiments, the risk determination system may select different subsets of features for the models in each layer of the enhanced gradient boosting tree such that the features selected for the models in each layer does not overlap with features selected for another layer (e.g., the previous layer) of the enhanced gradient boosting tree. In some embodiments, the risk determination system may allow partial overlapping (but not complete overlapping) in the features between layers of the enhanced gradient boosting tree. For example, the risk determination system may determine an overlapping threshold and may select the subsets of features for models in a layer such that the selected features do not overlap with features selected for a previous layer above the overlapping threshold.

In some embodiments, the risk determination system may select different subsets of features for each model and in each layer from the same pool of features (e.g., the entire set of features). In some embodiments, however, the risk determination system may modify the pool of features from which the subset of features can be selected for each model and/or for each layer of the enhanced gradient boosting tree. For example, the risk determination system may select different subsets of features for models in the first layer of the enhanced gradient boosting tree from a first pool of features. In some embodiments, the first pool of features may include the entire set of features. After building and training the models in the first layer of the enhanced gradient boosting tree, the risk determination system may determine a second pool of features by modifying the first pool of features for a second layer of the enhanced gradient boosting tree. In some embodiments, the risk determination system may remove one or more features from the first pool of features to generate the second pool of features. The risk determine system may select the one or more features to be removed from the first pool of features based on the determined error(s) associated with individual models in the first layer. For example, the risk determination system may select a feature associated with a model in the first layer having the largest error. The risk determination system may then select different subsets of features for the models in the second layer from the second pool of features. By eliminating feature(s) that contribute to large error in the prediction from the pool of features for selection, the accuracy performance of the resulting enhanced gradient boosting tree may be further improved. In some embodiments, the risk determination system may modify the pool of features for selection only for a portion of the layers (not all layers) in the enhanced gradient boosting tree (e.g., the first few layers, every $10^{th}$ layer, etc.).

A pool of training data sets may be used for training the models by the risk determination model. In some embodiments, the risk determination system may train each model in the enhanced gradient boosting tree with the same training data set (e.g., the entire pool of training data set). In some embodiments, however, the risk determination system may select different subsets of training data for training different models in the enhanced gradient boosting tree. For example, the risk determination system may select a predetermined portion of training data sets from the pool (e.g., 30%, 50%, 70%, etc.) for training each model in the enhanced gradient boosting tree. The selection of training data sets may be performed using a randomizer. In some embodiments, the risk determination system may adjust the amount of training data sets for training models in different layers of the enhanced gradient boosting tree. For example, the risk determination system may increase (or decrease) the amount of training data sets for training models in different layers, such as by increasing the amount of training data sets (e.g., by a predetermined percentage, etc.) in at least some of the layers (e.g., the first few layers, every $10^{th}$ layer, etc.) of the enhanced gradient boosting tree. By increasing the amount of training data over different layers of the enhanced gradient boosting tree (also known as adaptive learning), the accuracy performance of the enhanced gradient boosting tree is further improved.

FIG. 1 illustrates an electronic transaction system 100, within which the risk determination system described herein may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via a website hosted by the merchant server 120, a mobile application associated with the merchant server 120, or a point-of-sale (POS) system associated with the merchant server 120. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile payment application, etc.), which may be utilized by the user 140 to conduct electronic transactions (e.g., online payment transactions, etc.) with the merchant server 120 and/or the service provider server 130 over the network 160. In one aspect, purchase expenses may be directly and/or automatically debited from an account related to the user 140 via the user interface application 112.

In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. Even though only one merchant server 120 is shown in FIG. 1, it has been contemplated that one or more merchant servers (each similar to merchant server 120) may be communicatively coupled with the service provider server 130 and the user device 110 via the network 160 in the system 100. As such, the service provider server 130 may facilitate payment transactions for users with different merchants associated with different merchant servers similar to the merchant server 120.

The service provider server 130, in one embodiment, may be maintained by a transaction processing entity or an online service provider, which may provide processing for electronic transactions between users (e.g., the user 140 of user device 110), between merchants, and/or between users and merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the data server 134 may include pre-generated electronic content ready to be served to users. For example, the data server 134 may store a log-in page and is configured to serve the log-in page to users for logging into user accounts of the users to access various service provided by the service provider server 130. The data server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a risk determination module 132 that implements the risk determination system as discussed herein. In some embodiments, the risk determination module 132 may generate a machine learning model (e.g., an enhanced gradient boosting tree) using enhanced gradient boosting techniques as described herein. Using the enhanced gradient boosting techniques, the risk determination module 132 may build and train multiple models (e.g., multiple decision trees) for each layer of the enhanced gradient boosting tree in parallel. A collective error may be determined for each layer of the enhanced gradient boosting tree based on training data. A subsequent layer, which includes another set of multiple models, may be built and trained to reduce the collective error of the previous layer of the enhanced gradient boosting tree. Since the different models in each layer of the enhanced gradient boosting tree can be built and trained in parallel, the time required to build the enhanced gradient boosting tree using the enhanced gradient boosting technique is substantially reduced from the time for building a comparable gradient boosting tree having the same number of models using conventional gradient boosting techniques.

Figure 2:
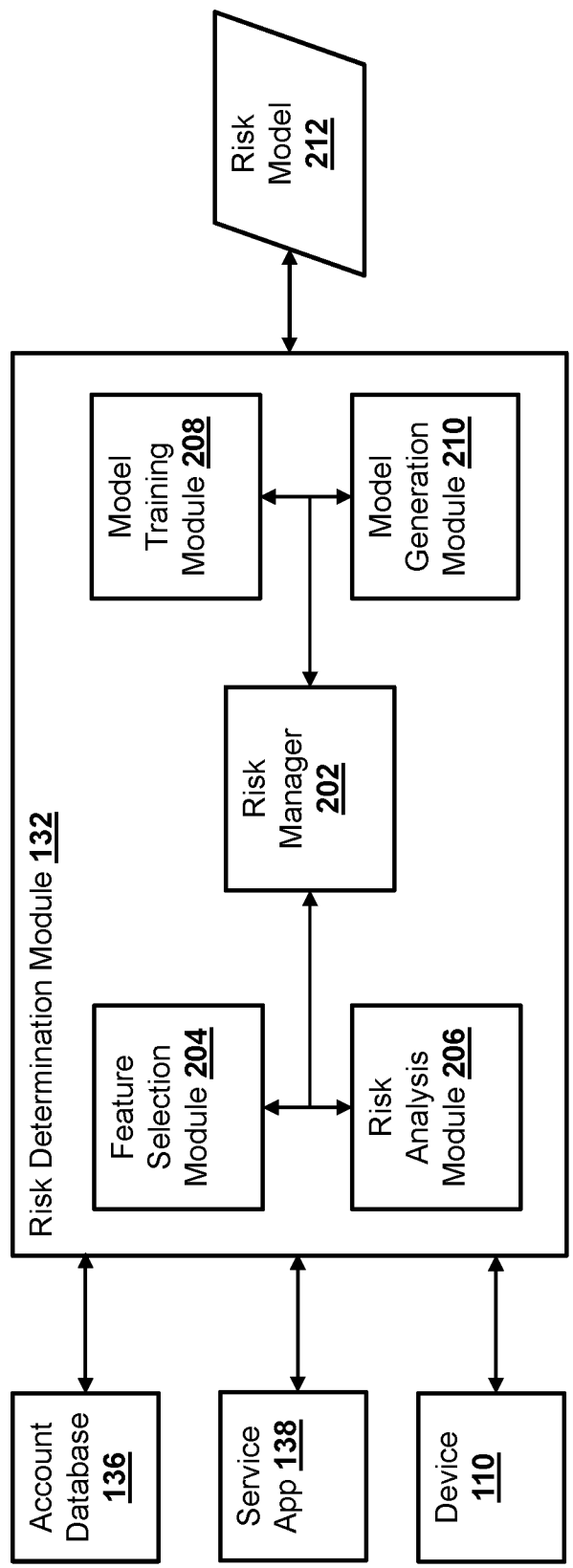
FIG. 2 is a block diagram illustrating a risk determination module according to an embodiment of the present disclosure.

FIG. 2 illustrates a block diagram of the risk determination module 132 according to an embodiment of the disclosure. The risk determination module 132 includes a risk manager 202, a feature selection module 204, a risk analysis model 206, a model training module 208, and a model generation module 210. Some or all of the risk manager 202, the feature selection module 204, the risk analysis model 206, the model training module 208, and the model generation module 210 may be implemented as computer software programs.

In some embodiments, the risk determination module 132 may be configured to generate a risk model 212 for predicting a risk associated with a transaction request for the service provider server 130. As discussed above, users, such as the user 140 or merchants, may access services provided by the service provider server 130. Through devices such as the user device 110, the merchant server 120, or other devices, the users of the service provider server 130 may submit transaction requests to the service provider server. For example, the user 140 may submit a transaction request to the service provider server 130 via the user interface application 112 executed on the user device 110. The transaction request may be a login transaction request for logging in to a user account, a payment transaction request for performing a payment transaction using funds from the user account, an information access transaction request for accessing information associated with the user account, a purchase transaction request for making a purchase using funds from the user account, or other types of electronic transaction request. Thus, the risk determination module 132 may generate multiple risk models (each similar to the risk model 212) for predicting risk for different transaction requests.

In some embodiments, the risk model 212 may be configured to receive input values corresponding to a set of features and to produce one or more output values corresponding to a predicted risk. In this example where the risk model 212 is configured to predict a risk associated with an electronic transaction request received by the service provider server 130, the set of features may be related to attributes associated with the transaction request (e.g., an amount, a merchant identity, a product or a service associated with the transaction request, etc.), attributes associated with a device used to submit the transaction request (e.g., a device manufacturer, a location of the device, a browser type, an operating system, an Internet Protocol (IP) address, a device identifier, browsing history associated with the device, etc.), and attributes associated with the user account associated with the transaction request (e.g., a transaction history of the user account, a transaction failure rate, device types and IP addresses used for the user account, etc.). Some of the features may be related to the same attribute. For example, when the risk model 212 is for predicting a risk associated with a payment transaction request, a feature may be whether an amount in the transaction request is over a predetermined amount (e.g., $500) and another feature may be whether the amount in the transaction request is over another predetermined amount (e.g., $5,000). In another example, one feature may be whether the device is located within a predetermined region (e.g., Czech Republic, etc.) and another feature may be whether the device is located outside the residential area of the user. Therefore, the set of features, in some cases, can include thousands, hundreds of thousands, and even millions of different features. In some embodiments, the input values may be retrieved from (or generated based on the data from) databases (e.g., the accounts database 136) associated with the service provider server 130. In some embodiments, the input values may also be obtained from the devices that submitted the transaction request (e.g., the user device 110, the merchant server 120, etc.).

In some embodiments, the risk model 212 may be a machine learning model. Specifically, the risk model 212 may be a machine learning model (also referred to as "an enhanced gradient boosting tree") generated by the risk determination module 132 using enhanced gradient boosting techniques described herein. Using the enhanced gradient boosting techniques, the risk manager 202 may compile different models to generate the risk model 212. The different models may use different subsets of features to produce corresponding predictions. Each subset of features may correspond to a small portion of the set of features. For example, the risk manager 202 may determine a number (e.g., 2 features, 3 features, etc.) or a percentage (e.g., 1%, 2%, etc.) for use in each of the models.

The risk model 212 that is generated using the enhanced gradient boosting techniques may include multiple layers of models, where each layer may include multiple different models. Thus, to generate the risk model 212, the risk manager 202 may use the model generation module 210 to first generate models for a first layer of an enhanced gradient boosting tree. Each of the models may be implemented as a decision tree (or any other type of machine learning models such as a regression model, a neural network, etc.), and is configured to receive a subset of features and to produce a prediction (e.g., a predicted risk associated with a transaction request) In some embodiments, the risk manager 202 may use the feature selection module 204 to select a subset of features for each of the models in the first layer of the enhanced gradient boosting tree.

In some embodiments, the feature selection module 204 may select, from a pool of selectable features, different subsets of features for the different models in the first layer 300 of the enhanced gradient boosting tree. For example, the pool of features may include the entire set of features or a portion of the set of features. The feature selection module 204 may use an algorithm (e.g., a randomizer) to select a predetermined number (e.g., 1, 2, 4, etc.) of features from the pool of features for each model in the first layer 300. In some embodiments, the model generation module 210 may use the subsets of features selected by the feature selection module 204 to implement the corresponding models.

Figure 3:
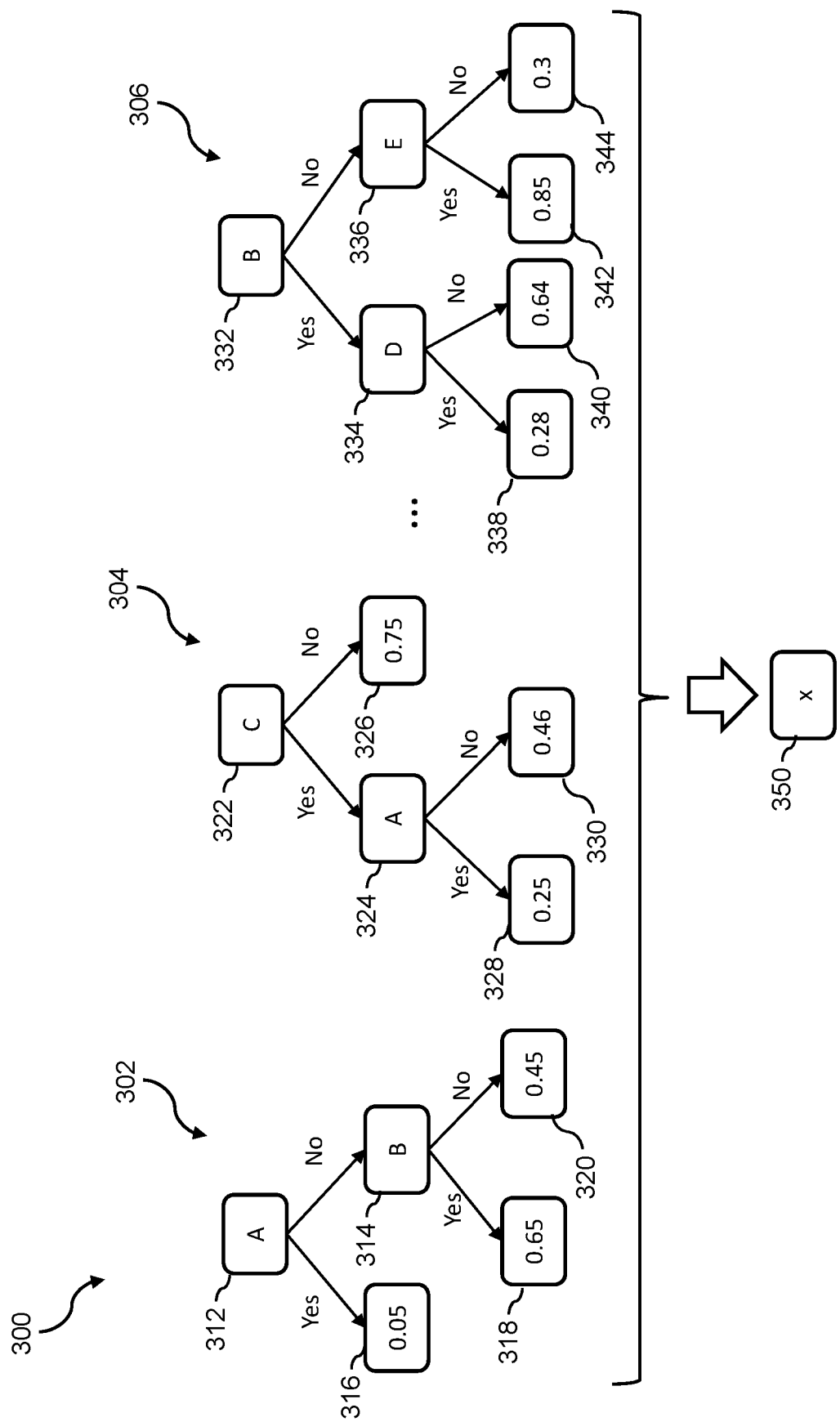
FIG. 3 illustrates a first layer of an enhanced gradient boosting tree according to an embodiment of the present disclosure.

FIG. 3 illustrates a first layer 300 of models generated by the model generation module 210 for the risk model 212 according to one embodiment. As shown, the model generation module 210 has generated three models 302, 304, and 306 for the first layer 300 of the enhanced gradient boosting tree. Although only three models are shown in this example, more (or less) number of models can be generated for each layer of the enhanced gradient boosting tree by the model generation module 210. Each of the models 302, 304, and 306 may use a different subset of features (selected by the feature selection module 204) to produce a risk prediction. For example, the feature selection module 204 has selected features A and B for the model 302, features C and A for the model 304, and features B, D, and E for the model 306. While the subsets of features selected for the different models 302, 304, and 306 for the first layer 300 of the enhanced gradient boosting tree in this example are partially overlapping, the risk manager 202 may configure the feature selection module 204 to select non-overlapping features for the different models in other some embodiments. Furthermore, it is shown in this example that different models in the first layer 300 of the enhanced gradient boosting tree may include different number of features (e.g., the model 306 includes three features while each of the models 302 and 304 has two features). In some embodiments, the risk manager 202 may configure the feature selection module 204 to select the same number of features for each model in the first layer 300 (for example, each model in the first layer includes 2 features).

In this example, each of the models 302, 304, and 306 is implemented as a decision tree. As shown, the model 302 includes two conditional branches 312 and 314, where each branch is associated with a condition related to a different feature. The branch 312 is associated with a condition related to feature 'A' and the branch 314 is associated with a condition related to feature 'B'. For example, feature 'A' may be associated with whether a transaction amount is over $500 and feature 'B' may be associated with whether the user device is a mobile device. The models 304 and 306 each operate in a similar fashion, but using conditions related to features 'C' and 'A', and conditions related to features 'B,' 'D,' and 'E,' respectively, instead of conditions related to features 'A' and 'B.' Depending on input value(s), each of the models 302, 304, and 306 will reach a leaf node, which produces a corresponding risk prediction. In some embodiments, the model training module 208 may train each of the models 302, 304, and 306 using training data.

The training data may be associated with historic transaction data conducted by one or more users of the service provider server 130 in the past. In some embodiments, the model training module 208 may obtain the historic transaction data, for example, from the account database 136 and/or other databases associated with the service provider server 130. The model training module 208 may organize the historic transaction data into different training data sets. Each training data set may correspond to a past transaction request, and may include attributes associated with the set of features. In addition, each training data set may be labeled by the model training module 208 with the actual risk of the transaction request determined by the service provider server 130. The compiled training data sets may form the pool of training data sets from which training data can be selected to train the models, such as the models 302, 304, and 306.

In some embodiments, the model training module 208 may use the entire pool of training data sets to train each of the models 302, 304, and 306. However, in some embodiments, the model training module 208 may select only a portion of the pool of training data sets to train each of the models 302, 304, and 306. For example, the model training module 208 may be configured to select a percentage (e.g., 30%, 50%, 70%, etc.) of training data sets from the pool for training the models 302, 304, and 306 (e.g., using a randomizer). In some embodiments, the model training module 208 may select different training data sets from the pool for training the different models 302, 304, and 306.

Since each of the models 302, 304, and 306 is not dependent on another model, the model training module 208 may train the models 302, 304, and 306 independently and in parallel. Using the training data sets to train the models 302, 304, and 306 enables each of the models to learn from the past transaction request corresponding to the training data sets to determine (e.g., predict) a risk based on attributes corresponding to the features included in the models. For example, the model 302 may learn, from the training data sets used to train the model 302, how the features 'A' and 'B' affect the risk of the transaction request. After training the models 302, 304, and 306, each of the models is trained to produce a risk prediction based on input values corresponding to the features associated with the models. For example, the model 302, after being trained, is configured to predict a risk value of 0.05 (at the leaf node 316) when the condition related to feature 'A' at the node 312

(e.g., whether a transaction amount is over $500) is true, to predict a risk value of 0.65 (at the leaf node 318) when the condition related to feature 'A' at the node 312 (e.g., whether a transaction amount is over $500) is false and the condition related to feature 'B' at the node 314 (e.g., whether the user device is a mobile device) is true, and to predict a risk value of 0.45 (at the leaf node 320) when the condition related to feature 'A' at the node 312 (e.g., whether a transaction amount is over $500) is false and the condition related to feature 'B' at the node 314 (e.g., whether the user device is a mobile device) is false.

Similarly, the model 304 is also configured to produce different risk values based on different input values associated with features 'C' and 'A' after being trained with the training data sets. In this example, the model 304 is configured to predict a risk value of 0.75 (at the leaf node 326) when the condition related to feature 'C' at the node 322 is false, to predict a risk value of 0.25 (at the leaf node 328) when the condition related to feature 'C' at the node 322 is true and the condition related to feature 'A' at the node 324 is true, and to predict a risk value of 0.46 (at the leaf node 330) when the condition related to feature 'C' at the node 322 is true and the condition related to feature 'A' at the node 324 is false.

The model 306 is configured to produce different risk values based on different input values associated with features 'B,' 'D,' and 'E' after being trained with the training data sets. In this example, the model 306 is configured to predict a risk value of 0.28 (at the leaf node 338) when the condition related to feature 'B' at the node 332 is true and the condition related to feature 'D' at the node 334 is also true, to predict a risk value of 0.64 (at the leaf node 340) when the condition related to feature 'B' at the node 332 is true and the condition related to feature 'D' at the node 334 is false, to predict a risk value of 0.85 (at the leaf node 342) when the condition related to feature 'B' at the node 332 is false and the condition related to feature 'E' at the node 336 is true, and to predict a risk value of 0.3 (at the leaf node 344) when the condition related to feature 'B' at the node 332 is false and the condition related to feature 'E' at the node 336 is also false.

In some embodiments, once the models 302, 304, and 306 in the first layer 300 of the enhanced gradient boosting tree is built and trained, the model generation module 210 may determine a collective error for the first layer 300 based on output values of the models 302, 304, and 306. Different embodiments of the model generation module 210 may use different techniques to determine the collective error. In some embodiments, the model generation module 210 may determine a collective output value 350 representing a risk of the transaction request based on the output values obtained from each of the models 302, 304, and 306 in the first layer 300. For example, after providing input values corresponding to the different features that are associated with a past transaction request, each of the models 302, 304, and 306 may predict a corresponding risk value. The model generation module 210 may determine the collective output value 350 for the first layer 300 based on the output values from the models 302, 304, and 306 (e.g., an average of the output values from the models 302, 304, and 306). The model generation module 210 may then compute the collective error based on the collective output value 350 and the training data. For example, the model generation module 210 may obtain the collective output value by providing input values associated with a past transaction request to the models 302, 304, and 306 and determine a collective risk value 350 based on the output value generated by each of the models 302, 304, and 306 (e.g., an average, etc.). The model generation module 210 may then determine the collective error based on a deviation between the collective output value 350 and the actual risk associated with the past transaction request (e.g., that is labeled by the model training module 208). In some embodiments, the model generation module 210 may determine multiple deviation values associated with multiple past transaction requests, and may compute the collective error based on the multiple deviation values (e.g., an average, etc.).

In some embodiments, the risk determination system may determine the collective error by first calculating an error for each of the models 302, 304, and 306 in the first layer 300. For example, the model generation module 210 may provide input values associated with a past transaction request to each of the models 302, 304, and 306, and obtain an output value from each of the models 302, 304, and 306. The model generation module 210 may then calculate an error for each of the models 302, 304, and 306 based on the output value from each of the models 302, 304, and 306 and actual risk associated with the past transaction request (e.g., that is labeled by the model training module 208). The model generation module 210 may then determine the collective error based on the errors associated with the models (e.g., an average error).

Figure 4:
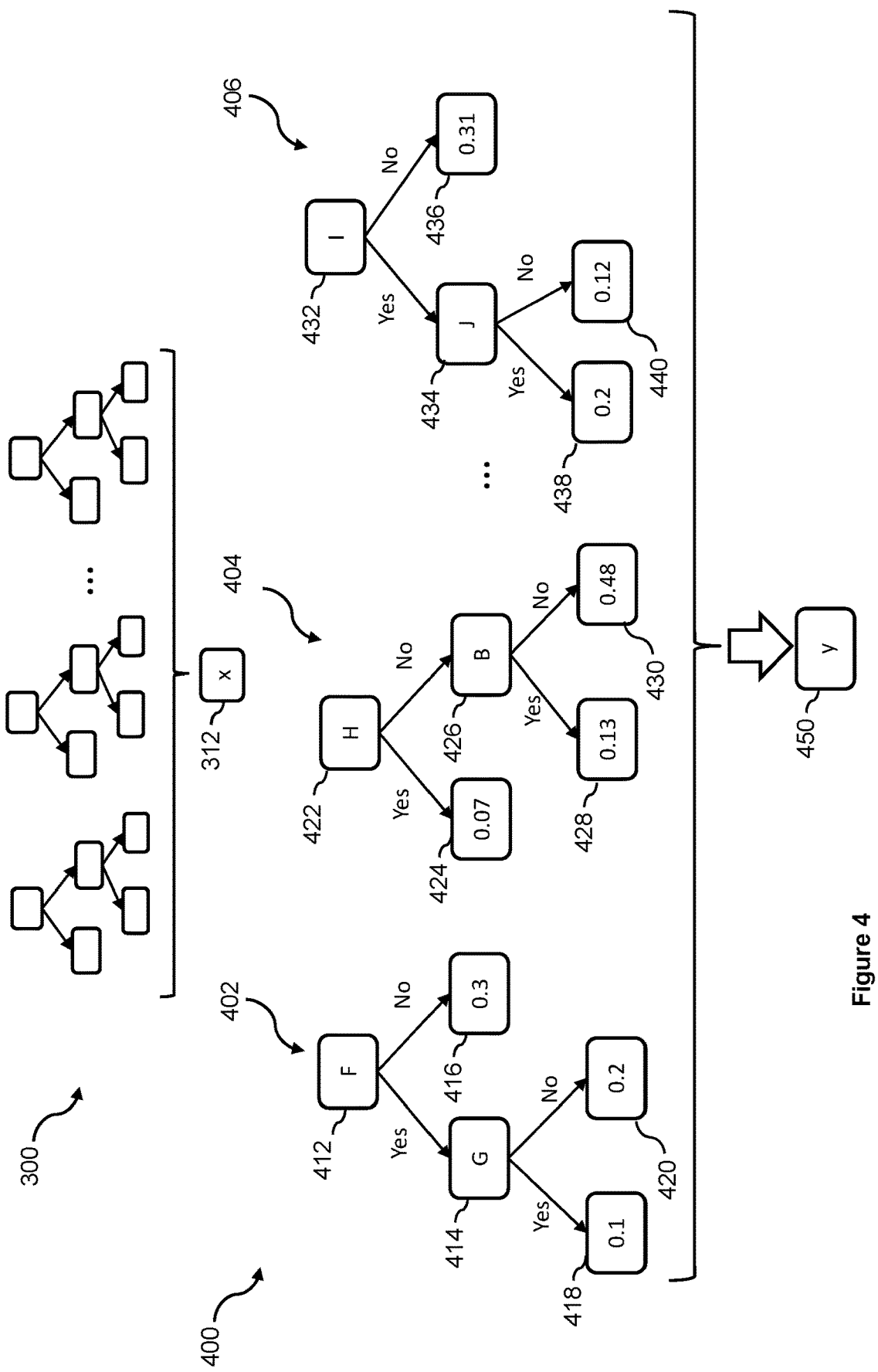
FIG. 4 illustrates a second layer of the enhanced gradient boosting tree according to an embodiment of the present disclosure.

After computing the collective error for the first layer 300, the model generation module 210 may build and train models for a second layer of the enhanced gradient boosting tree. The models in the second layer may be configured to receive different subsets (and in some embodiments, non-overlapping and/or partially overlapping subsets) of the set of features and to produce one or more output values corresponding to a prediction and/or classification (e.g., a risk associated with a transaction request, etc.). FIG. 4 illustrates a second layer 400 of models generated by the model generation module 210 for the risk model 212. As shown, the model generation module 210 has generated three models 402, 404, and 406 for the second layer 400 of the enhanced gradient boosting tree. Although only three models are shown in this example, more (or less) number of models can be generated for each layer of the enhanced gradient boosting tree by the model generation module 210. Each of the models 402, 404, and 406 may use a different subset of features (selected by the feature selection module 204) to produce a risk prediction.

In this example, the model generation module 210 generated the same number of models (e.g., 3) for the second layer 400 as the first layer 300 of the enhanced gradient boosting tree. However, in some embodiments, the risk manager 202 may configure the model generation module 210 to generate different numbers of models for different layers. For example, the model generation module 210 may be configured to increase (or decrease) the number of models as each additional layer is built and added to the enhanced gradient boosting tree. In some embodiments, the model generation module 210 may increase (or decrease) the number of models in each additional layer by a predetermined number. Thus, the model generation module 210 may build n number of models for the first layer 300 of the enhanced gradient boosting tree, and build n+x number of models for the second layer 400, and then building n+(2x) number of models for the third layer, and so forth (where x can be any predetermined discrete number). In some embodiments, the model generation module 210 may not adjust the number of models at each additional layer, but only for some of the layers (e.g., the first five layers, every $5^{th}$ layer, etc.).

In some embodiments, the feature selection module 204 may select, from a pool of selectable features, different subsets of features for the different models 402, 404, and 406 in the second layer 400 of the enhanced gradient boosting tree. For example, the pool of features may include the entire set of features or a portion of the set of features. In some embodiments, the pool of features used for selecting subset of features for the second layer 400 may be the same pool of features used by the feature selection module 204 for selecting subsets of features for the first layer 300. In some embodiments, however, after building and training the first layer 300 of models, the model generation module 210 may modify the pool of features before selecting subsets of features for the second layer 400. For example, the model generation module 210 may remove one or more features from the pool of features based on the errors determined for one or more of the models 302, 304, and 306. In one example, the model generation module 210 may identify one or more features used by the models 302, 304, and 306 that contributed to an error of the model above a threshold. The model generation module 210 may then remove the identified one or more features from the pool of features, and may configure the feature selection module 204 to use the modified pool of features (instead of the entire set of features) to select the subsets of features for the models 402, 404, and 406. By eliminating feature(s) that contribute to large error in the prediction from the pool of features for selection, the accuracy performance of the resulting enhanced gradient boosting tree may be further improved. In some embodiments, the feature selection module 204 may modify the pool of features for selection only for a portion of the layers (not all layers) in the enhanced gradient boosting tree (e.g., the first few layers, every $10^{th}$ layer, etc.).

Similar to the selection of subsets of features for the first layer 300, the feature selection module 204 may use an algorithm (e.g., a randomizer) to select a predetermined number (e.g., 1, 2, 4, etc.) of features from the modified pool of features for each model in the second layer 400. In some embodiments, the model generation module 210 may use the subsets of features selected by the feature selection module 204 to implement the corresponding models 402, 404, and 406. In this example, the feature selection module 204 has selected features 'F' and 'G' for the model 402, features 'H' and 'B' for the model 404, and features 'I,' and 'J' for the model 406. While the subsets of features selected for the different models 402, 404, and 406 for the second layer 400 of the enhanced gradient boosting tree in this example are non-overlapping, the risk manager 202 may configure the feature selection module 204 to select partially overlapping features for the different models in other some embodiments.

Similar to the models in the first layer 300, since the models 402, 404, and 406 in the second layer 400 do not depend on each other, the models 402, 404, and 406 can be built and trained independently from each other. Thus, the model generation module 210 and the model training module 208 may build and train the models 402, 404, and 406 in parallel. In some embodiments, the model generation module 210 and the model training module 208 are configured to build and train the models 402, 404, and 406 to produce output values corresponding to the prediction and/or classification (e.g., a risk associated with a transaction request, etc.) with a goal to reduce the collective error associated with the first layer 300 of the enhanced gradient boosting tree.

The model training module 208 may use the training data sets to train the models 402, 404, and 406. In some embodiments, the model training module 208 may use the entire training sets to train each of the models 402, 404, and 406. However, in other embodiments, the model training module 208 may select different portions of the training data sets to train the models 402, 404, and 406. For example, the model training module 208 may be configured to select a percentage (e.g., 30%, 50%, 70%, etc.) of training data sets from the pool for training the models 402, 404, and 406 (e.g., using a randomizer). In some embodiments, the model training module 208 may select different training data sets from the pool for training the different models 402, 404, and 406.

In some embodiments, the model training module 208 may adjust the amount of training data sets for training models in different layers of the enhanced gradient boosting tree. For example, the model training module 208 may increase (or decrease) the amount of training data sets for training models in different layers, such as by increasing the amount of training data sets (e.g., by a predetermined percentage, etc.) from a previous layer in at least some of the layers of the enhanced gradient boosting tree. For example, when the model training module 208 is configured to select 30% of training data sets from the pool of training data set for training the models 302, 304, and 306 in the first layer 300, the model training module 208 may select a larger percentage (e.g., 40%) for the second layer 400. By increasing the amount of training data over different layers of the enhanced gradient boosting tree (also known as adaptive learning), the accuracy performance of the enhanced gradient boosting tree is further improved. In some embodiments, the model training module 208 may modify the amount of training data sets for training models in only some of the layers (not all layers) in the enhanced gradient boosting tree (e.g., the first few layers, every $10^{th}$ layer, etc.).

Using the training data sets to train the models 402, 404, and 406 enables each of the models to learn from the past transaction request corresponding to the training data sets to determine (e.g., predict) a risk based on attributes corresponding to the features included in the models. In some embodiments, the models 402, 404, and 406 are trained to adjust the collective risk value 350 produced by the previous layer (e.g., the first layer 300) to reduce the collective error of the previous layer. For example, the model 402 may learn, from the training data sets used to train the model 402, how the features F and G affect the risk of the transaction request, and thus be used to reduce the collective error associated with the first layer 300. After training the models 402, 404, and 406, each of the models is trained to produce a risk prediction based on input values corresponding to the features associated with the models. For example, the model 402, after being trained, is configured to predict a risk value of 0.3 (at the leaf node 416) when the condition related to feature 'F' at the node 412 is false, to predict a risk value of 0.1 (at the leaf node 418) when the condition related to feature 'F' at the node 412 is true and the condition related to feature 'G' at the node 414 is true, and to predict a risk value of 0.2 (at the leaf node 420) when the condition related to feature 'F' at the node 412 is true and the condition related to feature 'G' at the node 414 is false.

Similarly, the model 404 is also configured to produce different risk values based on different input values associated with features 'H' and 'B' after being trained with the training data sets. In this example, the model 404 is configured to predict a risk value of 0.07 (at the leaf node 424) when the condition related to feature 'H' at the node 422 is true, to predict a risk value of 0.13 (at the leaf node 428) when the condition related to feature 'H' at the node 422 is false and the condition related to feature 'B' at the node 426 is true, and to predict a risk value of 0.48 (at the leaf node 430) when the condition related to feature 'H' at the node 422 is false and the condition related to feature 'B' at the node 426 is also false.

The model 406 is configured to produce different risk values based on different input values associated with features 'I,' and 'J' after being trained with the training data sets. In this example, the model 406 is configured to predict a risk value of 0.31 (at the leaf node 436) when the condition related to feature 'I' at the node 432 is false, to predict a risk value of 0.2 (at the leaf node 438) when the condition related to feature 'I' at the node 432 is true and the condition related to feature T at the node 434 is also true, and to predict a risk value of 0.12 (at the leaf node 440) when the condition related to feature 'I' at the node 432 is true and the condition related to feature T at the node 434 is false.

In some embodiments, once the models 402, 404, and 406 in the second layer 400 of the enhanced gradient boosting tree are built and trained, the model generation module 210 may determine a collective error for the second layer 400 based on output values of the models 402, 404, and 406 using the techniques described herein (e.g., based on a collective output value 450). The model generation module 210 may continue to build additional layers to the enhanced gradient boosting tree using the techniques described herein until a termination condition is detected. In some embodiments, the termination condition may be associated with a maximum number of layers or a maximum number of models. In some embodiments, the termination condition may be associated with a collective error threshold. When the risk manager 202 detects the termination condition, the risk manager 202 may instruct the model generation module 210 to abort building new layers to the enhanced gradient boosting tree, and may use the built enhanced gradient boosting tree as the risk model 212.

Once the risk model 212 is built, the risk determination module 132 may use the risk model 212 to predict risks associated with incoming transaction requests. For example, when a transaction request is received by the interface server 134 of the service provider 130, the interface server 134 may obtain attributes associated with the set of features and provide the attributes to the risk determination module 132. The risk determination module 132 may provide the attributes to the risk model 212 as input values, and may obtain a risk prediction from the risk model 212. The interface server 134 (or another application) may use the risk prediction generated by the risk model 212 to determine a response to the transaction request (e.g., authorize the transaction request, deny the transaction request, etc.).

Figure 5:
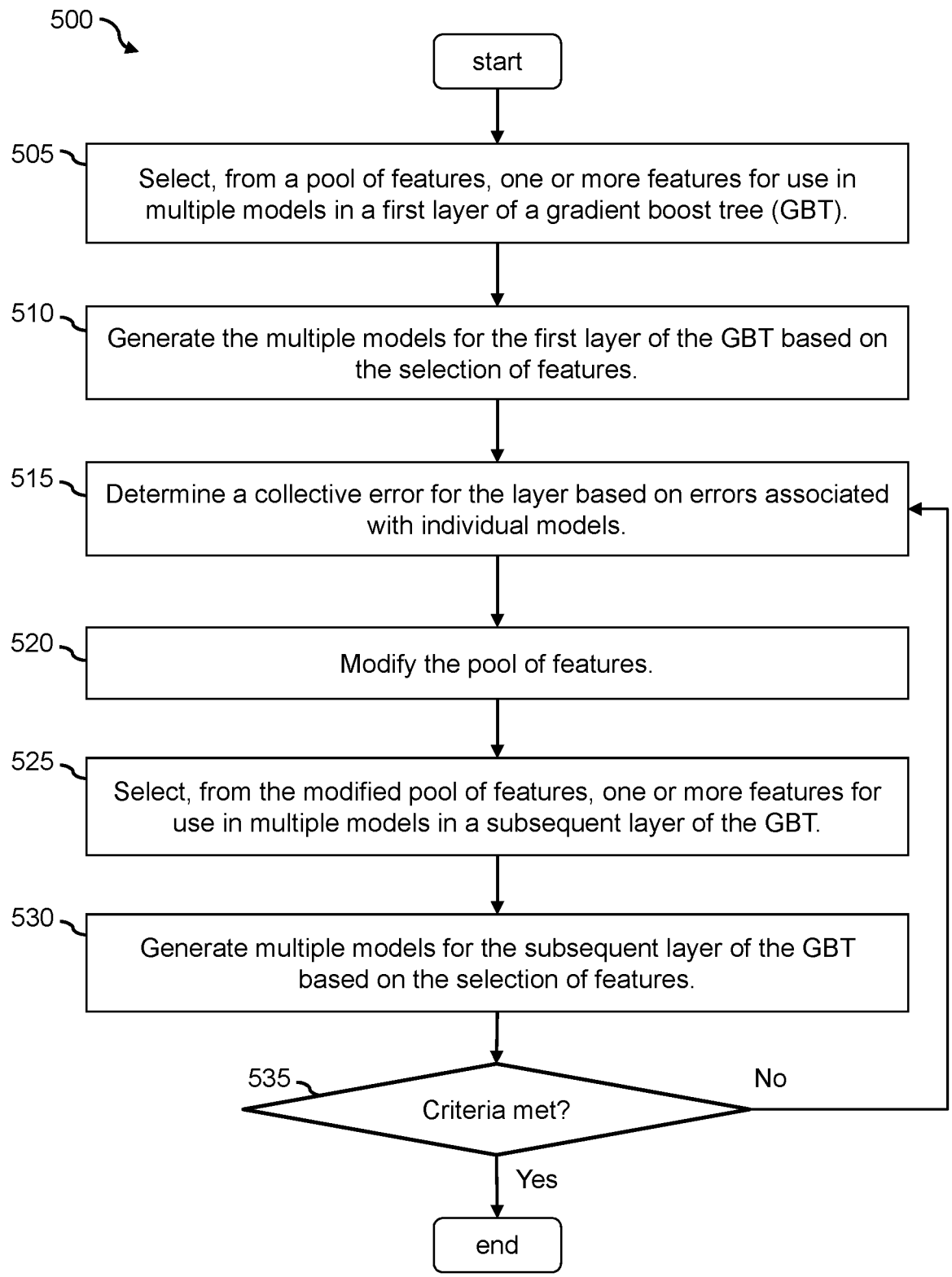
FIG. 5 is a flowchart showing a process of generating a risk model according to an embodiment of the present disclosure.

FIG. 5 illustrates a process 500 for using the enhanced gradient boosting techniques to build a risk model according to one embodiment of the disclosure. In some embodiments, at least some of all of the steps in the process 500 may be performed by the risk determination module 132. The process 500 begins by selecting (at step 505), from a pool of features, one or more features for use in multiple models in a first layer of a gradient boosting tree (GBT). For example, the model generation module 210 may use the feature selection module 204 to select different subsets of features for different models in the first layer 300 of the enhanced gradient boosting tree.

The process 500 then generates (at step 510) the multiple models for the first layer of the GBT based on the selected features. For example, the model generation module 210 may build the models 302, 304, and 306 for the first layer 300 of the enhanced gradient boosting tree based on the different subsets of features selected for the models. The model generation module 210 may configure the models 302, 304, and 306 to produce an output value corresponding to a prediction (e.g., a risk prediction) based on the corresponding subsets of features. In some embodiments, the model training module 208 may train the models 302, 304, and 306 using training data associated with past transaction requests.

The process 500 then determines (at step 515) a collective error for the layer based on errors associated with individual models. For example, the model generation module 210 may determine a collective error for the first layer 300 based on the output values generated by the models 302, 304, and 306. In some embodiments, the collective error may be determined based on errors associated with each of the models 302, 304, and 306. In some embodiments, the collective error may be determined based on a collective output value generated by a function of the output values from the models 302, 304, and 306.

The process 500 then modifies (at step 520) the pool of features, selects (at step 525), from the modified pool of features, one or more features for use in multiple models in a subsequent layer of the GBT, and generates (at step 530) multiple models for the subsequent layer of the GBT based on the selection of features. For example, after building and training the models in the first layer 300, the model generation module 210 may modify the pool of features. In some embodiments, the model generation module 210 may remove one or more features that were used in the models 302, 304, or 306 (e.g., one or more features identified as contributing to an error, etc.). For example, the model generation module 210 may use the feature selection module 204 to select different subsets of features for the models 402, 404, and 406 in the second layer 400. The feature selection module 204 may then select subsets of features for the models 402, 404, and 406 from the modified pool of features. The model generation module 210 then generates the models 402, 404, and 406 using the selected subsets of features.

The process 500 the determines (at step 535) whether the termination criteria is met. If the termination criteria are met, the process 500 ends. For example, the risk manager 202 may determine whether the termination condition exists. The termination condition may be associated with the number of models or layers in the enhanced gradient boosting tree, or associate with a collective error of the enhanced gradient boosting tree. For example, if the risk manager 202 determines that the number of models or the number of layers in the enhanced gradient boosting tree has reached or exceeded the threshold number of models or threshold number of layers, the risk manager 202 may instruct the model generation module 210 to abort adding additional layers to the enhanced gradient boosting tree. In another example, if the risk manager 202 determines that the collective error associated with the enhanced gradient boosting tree is below an error threshold, the risk manager 202 may instruct the model generation module 210 to abort adding additional layers to the enhanced gradient boosting tree. However, if the termination criteria are not met (determined at the step 535), the process 500 reverts back to the step 515 and iterates through the step 535 to generate an additional layer of models in the GBT.

FIG. 6 is a block diagram of a computer system 600 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 1020 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the risk model generation functionalities described herein according to the process 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
 a non-transitory memory; and
 one or more hardware processors coupled with the non-transitory memory and configured to read instructions from the non-transitory memory to cause the system to perform operations comprising:
  generating a first plurality of decision trees for a first layer of a gradient boosting tree, wherein the first plurality of decision trees comprises a first number of decision trees, and wherein each of the first plurality of decision trees is configured to receive input values corresponding to one or more risk detection features;
  determining, for each of the first plurality of decision trees, a prediction error based on a set of training data;

calculating a collective prediction error for the first layer of the gradient boosting tree based on the prediction error determined for each of the first plurality of decision trees;

determining a second number of decision trees for a second layer of the gradient boosting tree based on either adding a predetermined number to the first number or subtracting the predetermined number from the first number; and generating a second plurality of decision trees corresponding to the second number of decision trees for the second layer of the gradient boosting tree based on the collective prediction error calculated for the first layer of the gradient boosting tree.

2. The system of claim 1, wherein the operations further comprise:

selecting, for each decision tree in the first plurality of decision trees, one or more risk detection features from a set of risk detection features.

3. The system of claim 2, wherein the set of risk detection features comprises features associated with an electronic transaction, features associated with a user device that submitted the electronic transaction, and features associated with a user account used in the electronic transaction.

4. The system of claim 2, wherein the selecting comprises selecting different one or more risk detection features for different decision trees in the first plurality of decision trees.

5. The system of claim 2, wherein the operations further comprise:

modifying the set of risk detection features by removing at least one risk detection feature based on the prediction error determined for each of the first plurality of decision trees; and selecting, for each decision tree in the second plurality of decision trees, a corresponding subset of risk detection features from the modified set of risk detection features.

6. The system of claim 1, wherein the first plurality of decision trees is configured to use a first subset of risk detection features, from the set of risk detection features, to perform risk predictions, wherein the second plurality of decision trees is configured to use a second subset of risk detection features, from the set of risk detection features, to perform the risk predictions, and wherein the first subset of risk detection features has partially overlapping features with the second subset of risk detection features.

7. The system of claim 1, wherein the calculating the collective prediction error comprises determining an average based on the prediction error determined for each of the first plurality of decision trees.

8. The system of claim 7, wherein the average is a weighted average, and wherein the operations further comprise assigning weights to the first plurality of decision trees.

9. A method, comprising:

selecting, by one or more hardware processors from a set of features, subsets of features for a first plurality of models;

generating, by the one or more hardware processors, the first plurality of models for a first layer of a machine learning model for risk detection based on the subsets of features, wherein the first plurality of models comprises a first number of models, and wherein each of the first plurality of models is configured to receive input values corresponding to a corresponding subset of features for risk detection;

determining, by the one or more hardware processors, a collective prediction error associated with the first layer of the machine learning model based on a comparison between predicted risks obtained from the first plurality of models and labeled risks associated with a set of training data;

determining, by the one or more hardware processors, a second number of models for a second layer of the machine learning model based on either adding a predetermined number to the first number or subtracting the predetermined number from the first number; and generating, by the one or more hardware processors, a second plurality of models corresponding to the second number of models for the second layer of the machine learning model based on the collective prediction error associated with the first layer of the machine learning model.

10. The method of claim 9, further comprising:

selecting, for each model in the first plurality of models, a corresponding subset of training data from the set of training data; and training each model in the first plurality of models using the corresponding subset of training data.

11. The method of claim 10, further comprising:

modifying the set of training data;

selecting, for each model in the second plurality of models, a corresponding subset of training data from the modified set of training data; and training each model in the second plurality of models using the corresponding subset of training data.

12. The method of claim 11, wherein the modifying the set of training data comprises removing at least a portion of training data from the set of training data.

13. The method of claim 11, wherein the modifying the set of training data comprises inserting additional training data into the set of training data.

14. A non-transitory machine-readable medium having stored thereon machine-readable instructions executable to cause a machine to perform operations comprising:

selecting, from a set of risk detection features, subsets of risk detection features for a first plurality of models;

generating the first plurality of models for a first layer of a machine learning model based on the subsets of risk detection features, wherein the first plurality of models comprises a first number of models, and wherein each of the first plurality of models is configured to receive input values corresponding to a corresponding subset of risk detection features and to produce an output based on the input values;

determining a prediction error associated with the first plurality of models based on a comparison between outputs obtained from the first plurality of models and labeled risks associated with a set of training data;

determining a second number of models for a second layer of the machine learning model based on either adding a predetermined number to the first number or subtracting the predetermined number from the first number; and generating a second plurality of models corresponding to the second number of models for a second layer of the machine learning model based on the prediction error associated with the first plurality of models.

15. The non-transitory machine-readable medium of claim 14, wherein the operations further comprise:

receiving a request to determine a risk associated with a transaction request;

obtaining a set of input values associated with the transaction request and corresponding to the set of risk detection features;
providing the set of input values to the machine learning model; and
obtaining an output value corresponding to the risk associated with the transaction request from the machine learning model.

16. The non-transitory machine-readable medium of claim 14, wherein the set of risk detection features comprises features associated with an electronic transaction, features associated with a user device that submitted the electronic transaction, and features associated with a user account used in the electronic transaction.

17. The non-transitory machine-readable medium of claim 14, wherein the selecting comprises selecting different subsets of risk detection features for different models in the first plurality of models.

18. The non-transitory machine-readable medium of claim 14, wherein the operations further comprise:
modifying the set of risk detection features by removing at least one risk detection feature based on the prediction error determined for the first plurality of models; and
selecting, for each model in the second plurality of models, a subset of risk detection features from the modified set of risk detection features.

19. The method of claim 9, further comprising
modifying the set of features by removing at least one feature based on the collective prediction error associated with the first layer of the machine learning model; and
selecting, for each model in the second plurality of models, a corresponding subset of features from the modified set of features.

20. The method of claim 9, wherein the selecting comprises selecting different features for different models in the first plurality of models.

\* \* \* \* \*